US012806685B2

(12) United States Patent
Zhang et al.

(10) Patent No.: US 12,806,685 B2
(45) Date of Patent: Nov. 24, 2026

(54) METAL POWDER PREPARATION SYSTEM AND METHOD

(71) Applicant: Grinm Additive Manufacturing Technology co., LTD., Beijing (CN)

(72) Inventors: Shaoming Zhang, Beijing (CN); Qiang Hu, Beijing (CN); Yingjie Liu, Beijing (CN); Xinming Zhao, Beijing (CN); Xuexin Zhu, Beijing (CN); Jinhui Zhang, Beijing (CN); Yonghui Wang, Beijing (CN); Yanwei Sheng, Beijing (CN); Wenqian Guo, Beijing (CN); Wendong Zhao, Beijing (CN); Bo Liang, Beijing (CN); Liping Li, Beijing (CN); Xinyu Yang, Beijing (CN)

(73) Assignee: GRINM ADDITIVE MANUFACTURING TECHNOLOGY CO., LTD., Beijing (CN)

( * ) Notice: Subject to any disclaimer, the term of this patent is extended or adjusted under 35 U.S.C. 154(b) by 530 days.

(21) Appl. No.: 18/280,245

(22) PCT Filed: Nov. 7, 2022

(86) PCT No.: PCT/CN2022/130390
§ 371 (c)(1),
(2) Date: Sep. 4, 2023

(87) PCT Pub. No.: WO2024/087252
PCT Pub. Date: May 2, 2024

(65) Prior Publication Data

US 2025/0018471 A1 Jan. 16, 2025

(30) Foreign Application Priority Data

Oct. 24, 2022 (CN) ........................ 202211304453.4

(51) Int. Cl.
*B22F 9/08* (2006.01)
*B22F 1/065* (2022.01)
*B33Y 70/00* (2020.01)

(52) U.S. Cl.
CPC ................ *B22F 9/08* (2013.01); *B22F 1/065* (2022.01); *B22F 2009/0848* (2013.01);
(Continued)

(58) Field of Classification Search
CPC .... B22F 9/08; B22F 1/065; B22F 2009/0848; B22F 2009/0888; B22F 2009/0892;
(Continued)

(56) References Cited

U.S. PATENT DOCUMENTS

| | | | |
|---|---|---|---|
| 6,174,345 | B1 | 1/2001 | Chen et al. |
| 2020/0122237 | A1 | 4/2020 | Beemetal et al. |

FOREIGN PATENT DOCUMENTS

| | | | |
|---|---|---|---|
| CN | 101642808 A * | 2/2010 | |
| CN | 102689015 A | 9/2012 | |

(Continued)

OTHER PUBLICATIONS

Dietmar ("Pouring furnaces and pouring devices—state of the art and development targets") (Year: 2016).*
CN-101642808-A english (Year: 2010).*

*Primary Examiner* — Ricardo D Morales
(74) *Attorney, Agent, or Firm* — Bayramoglu Law Offices LLC

(57) ABSTRACT

A metal powder preparation system and method are provided. The metal powder preparation system includes a medium frequency smelting furnace, a homogeneous insulated quantitative pouring furnace, a precision-controlled liquid level temperature pouring ladle, and a plurality of groups of atomization mechanisms connected in sequence. The present application improves the preparation quality of
(Continued)

the metal powder, so that the parameters such as the powder particle size, sphericity, fluidity, oxygen content, component distribution, and particle size distribution of the metal powder can all meet the requirements of high-quality metal additive manufacturing, achieving efficient and continuous preparation of the metal powder at the same time.

19 Claims, 4 Drawing Sheets

(52) U.S. Cl.
CPC ................. *B22F 2009/0888* (2013.01); *B22F 2009/0892* (2013.01); *B22F 2301/052* (2013.01); *B33Y 70/00* (2014.12)

(58) Field of Classification Search
CPC ...... B22F 2301/052; B22F 9/082; B22F 9/12; B33Y 70/00; B22D 1/00; B22D 35/00; B22D 41/00; C22C 1/0416; Y02P 10/25
See application file for complete search history.

(56) References Cited

FOREIGN PATENT DOCUMENTS

| | | | | | |
|---|---|---|---|---|---|
| CN | 104227005 | A | | 12/2014 | |
| CN | 104232898 | A | | 12/2014 | |
| CN | 105397100 | A | | 3/2016 | |
| CN | 105728676 | A | | 7/2016 | |
| CN | 107052352 | A | | 8/2017 | |
| CN | 107262730 | A | | 10/2017 | |
| CN | 208178425 | U | | 12/2018 | |
| CN | 109550969 | A | | 4/2019 | |
| CN | 109641276 | A | | 4/2019 | |
| CN | 213020948 | U | | 4/2021 | |
| CN | 113976899 | A | | 1/2022 | |
| CN | 114406272 | A | | 4/2022 | |
| CN | 114769603 | A | | 7/2022 | |
| JP | 2004183049 | A | | 7/2004 | |
| JP | 2021515094 | A | * | 6/2021 | .............. B22F 9/082 |
| JP | 7002656 | B2 | | 1/2022 | |

* cited by examiner

METAL POWDER PREPARATION SYSTEM AND METHOD

CROSS REFERENCE TO THE RELATED APPLICATIONS

This application is the national phase entry of International Application No. PCT/CN2022/130390, filed on Nov. 7, 2022, which is based upon and claims priority to Chinese Patent Application No. 202211304453.4, filed on Oct. 24, 2022, the entire contents of which are incorporated herein by reference.

TECHNICAL FIELD

The present application relates to the technical field of metal powder preparation for additive manufacturing, and in particular to a metal powder preparation system and method.

BACKGROUND

The technology of additive manufacturing at home and abroad is in a period of rapid development. No matter the national policy, government science and technology investment, or the high proportion of domestic and foreign technology industry investment has reached the peak; the industrial chain is gradually improving; and in recent years, the application of additive manufacturing technology in aerospace, automotive, military, daily necessities, and other fields is deepening. In the field of aerospace, the demand for products has been constantly updated and upgraded; the development cycle has been continuously shortened; and the manufacturing difficulty has been continuously increased, which has put forward higher and higher requirements for the manufacture of complex and large-scale components. It is not only required to have rapid manufacturing capability for complex and large-scale components with high efficiency and high performance, but also to have direct manufacturing capability for large-scale and complex components. Traditional manufacturing technology is difficult to meet the above requirements.

Metal additive manufacturing technology has become the best new technology to meet the technical challenges in this field because of its ability to achieve mold-free, fast, fully dense, and near-net forming of high-performance complex structure metal parts. In addition, metal additive system technology can meet the requirements of aerospace, weapons and equipment, automotive parts lightweight, integration, and topology optimization design and processing. The weight reduction of parts is an important index of aerospace, weapon equipment, and automobile parts, so light alloy materials have been rapidly applied. Aluminum is rich in resources and has a series of excellent characteristics, such as light density, good elasticity, and high specific stiffness and high specific strength. Therefore, aluminum will be widely used in the fields of aerospace, automobile manufacturing, and national defense and military industry. In the next 10 years, it will increase rapidly at a rate of more than 45%, becoming one of the important materials for metal 3D printing.

However, the requirements for additive manufacturing powder are relatively high. The commonly used powder has a micron particle size, spherical powder shape, good fluidity, low oxygen content, uniform composition, and narrow particle size distribution. At present, traditional methods such as inert gas atomization and plasma rotating electrode have technical problems such as poor sphericity, satellite ball, hollow powder, coarse particle size, and wide distribution. At the same time, it is difficult to continuously prepare high-quality metal powder for additive manufacturing, especially aluminum alloy powder at low cost in the prior art.

SUMMARY

In view of the above deficiencies, the main object of the present invention is to provide a metal powder preparation system and method. The metal powder preparation system, through such apparatus as a medium frequency smelting furnace, a gas-stirring homogeneous insulated quantitative pouring furnace, and a precision-controlled liquid level temperature pouring ladle, as well as a reasonable working parameter design, improves the preparation quality of the metal powder, so that the parameters such as the powder particle size, sphericity, flowability, oxygen content, component distribution, and particle size distribution of the metal powder can all meet the requirements of high-quality metal additive manufacturing, achieving efficient and continuous preparation of the metal powder at the same time.

In order to achieve the above object, according to a first aspect of the present invention, there is provided a metal powder preparation system including a medium frequency smelting furnace, a homogeneous insulated quantitative pouring furnace, a precision-controlled liquid level temperature pouring ladle, and a plurality of groups of atomization mechanisms connected in sequence.

By using the metal powder preparation system in the present technical solution, at least one group of atomization mechanisms can be continuously and quantitatively supplied with metal melt using a group of a medium frequency smelting furnace, a homogeneous insulated quantitative pouring furnace, and a precision-controlled liquid level temperature pouring ladle, to achieve the purpose of high-efficiency continuous pouring; and under the condition that the metal melt is continuously and quantitatively supplied to the atomization mechanisms by the medium frequency smelting furnace, homogeneous insulated quantitative pouring furnace, and precision-controlled liquid level temperature pouring ladle, the quality of the metal melt in terms of homogeneity, purity, and superheat is ensured, and the supply speed of the metal melt to the atomization mechanisms is accurately grasped. In this way, the preparation quality of metal powder can be improved, and the parameters such as the powder particle size, sphericity, flowability, oxygen content, component distribution, and particle size distribution of the metal powder can all meet the requirements of high-quality metal additive manufacturing, achieving efficient and continuous preparation of the metal powder at the same time.

In addition, the metal powder preparation system according to the present application may have the following additional technical features:

In some implementations of the present invention, the atomization mechanisms are provided with a plurality of groups and arranged in arrays.

Preferably, array arrangements of the atomization mechanisms are single-row arrangements or double-row arrangements.

Preferably, 2 to 4 sets of atomization mechanisms are provided.

In some implementations of the present invention, a diversion trench is connected between the homogeneous insulated quantitative pouring furnace and the precision-controlled liquid level temperature pouring ladle, the diversion trench being used for metal melt circulation from a liquid outlet of the homogeneous insulated quantitative pouring furnace to the precision-controlled liquid level temperature pouring ladle.

In some implementations of the present invention, the medium frequency smelting furnace, the homogeneous insulated quantitative pouring furnace, the diversion trench, the precision-controlled liquid level temperature pouring ladle, and the atomization mechanisms are hermetically connected in sequence.

In some implementations of the present invention, the medium frequency smelting furnace includes a smelting furnace body and a smelting furnace sealing cover provided on the smelting furnace body, the smelting furnace body including a medium frequency induction coil, a smelting crucible, and a temperature measurement and control power supply.

In some implementations of the present invention, a medium frequency smelting furnace protective gas tube is connected to the smelting furnace sealing cover, two ends of the medium frequency smelting furnace protective gas tube are connected to an interior of the smelting furnace body and a protective gas source, respectively.

In some implementations of the present invention, the homogeneous insulated quantitative pouring furnace includes a pouring furnace body and a pouring furnace cover provided on the pouring furnace body; a gas stirring tube is connected to the pouring furnace cover, one end of the gas stirring tube being connected to a stirring gas source and the other end extending into the pouring furnace body; and a liquid outlet of the pouring furnace body is provided with a valve for controlling liquid output volume of the pouring furnace body.

In some embodiments of the present invention, the stirring gas is argon or a mixture of argon and sulfur hexafluoride.

In some implementations of the present invention, the diversion trench includes a diversion trench body and a diversion trench cover, a diversion trench protective gas tube being mounted on the diversion trench cover, and two ends of the diversion trench protective gas tube being connected to an interior of the diversion trench body and a protective gas source, respectively.

In some implementations of the present invention, an observation window is provided on the diversion trench cover.

In some implementations of the present invention, at least one filter is provided in the diversion trench body.

Preferably, the filter is a ceramic filter.

In some embodiments of the present invention, the ceramic filter has a thickness of 22 to 35 mm and a pore size of 10 P to 20 P.

In some implementations of the present invention, the precision-controlled liquid level temperature pouring ladle includes a pouring ladle body, a pouring ladle cover, and a temperature-liquid level control cabinet, the pouring ladle body including a pouring ladle induction coil and a pouring ladle crucible, a laser liquid level device detection window being provided on the pouring ladle cover, and a laser liquid level device being provided at a top of the pouring ladle cover corresponding to the laser liquid level device detection window.

In some embodiments of the present invention, the pouring ladle body is provided with a copper shield on an inner side of an outer wall.

Preferably, the copper shield has a thickness of 2 to 4 mm.

In some implementations of the present invention, a pouring ladle protective gas tube is connected to the pouring ladle cover, two ends of the pouring ladle protective gas tube being connected to an interior of the pouring ladle body and a protective gas source, respectively.

In order to achieve the above object, according to a second aspect of the present invention, there is provided a metal powder preparation metal powder preparation method for preparing metal powder using the above metal powder preparation system, the metal powder preparation method including: adding raw materials into a medium frequency smelting furnace before heating and melting into a melt, and pouring the melt into a homogeneous insulated quantitative pouring furnace; stirring and homogenizing the melt in the homogeneous insulated quantitative pouring furnace, and quantitatively pouring the homogenized melt into a precision-controlled liquid level temperature pouring ladle; supplying a plurality of groups of atomization mechanisms with the melt continuously and quantitatively by the precision-controlled liquid level temperature pouring ladle; and the quantitatively-supplied melt being dispersed, cooled, and solidified in the atomization mechanisms to obtain uniform and stable metal powder and complete powder collection.

In addition, the metal powder preparation method according to the present application may have the following additional technical features:

In some implementations of the present invention, before the atomization mechanisms are started, the oxygen content of an atmosphere of the atomization mechanisms is controlled to be 150 to 2000 ppm by vacuuming and filling with nitrogen, argon, or helium, and a circulating gas temperature of the atomization mechanisms is 20 to 45° C. during the metal powder preparation.

In some implementations of the present invention, a protective gas is introduced into the medium frequency smelting furnace, a transportation process of the homogeneous insulated quantitative pouring furnace to the precision-controlled liquid level temperature pouring ladle, and the precision-controlled liquid level temperature pouring ladle to protect a metal melt.

Preferably, the protective gas is argon or a mixture of argon and sulfur hexafluoride.

Preferably, flow rates of the protective gas introduced into the medium frequency smelting furnace, the transportation process of the homogeneous insulated quantitative pouring furnace to the precision-controlled liquid level temperature pouring ladle, and the precision-controlled liquid level temperature pouring ladle are 15 to 25 L/min, 5 to 10 L/min, and 10 to 20 L/min, respectively.

In some implementations of the present invention, a stirring gas is introduced into the melt in the homogeneous insulated quantitative pouring furnace to homogenize the melt.

Preferably, the stirring gas is argon or a mixture of argon and sulfur hexafluoride.

A volume fraction of the sulfur hexafluoride is 5% to 20% when the stirring gas is the mixture of argon and sulfur hexafluoride.

Preferably, the flow rate of the stirring gas is 10 to 35 L/min.

In some embodiments of the present invention, the degree of superheat of the melt in the precision-controlled liquid level temperature pouring ladle is 100 to 320° C., the liquid level deviation is ±10 mm, and a melt flow rate of a nozzle at the bottom is 1.5 to 2 Kg/min.

Compared with the prior art, the present invention achieves the following technical effects:

1. The atomization mechanisms of the metal powder preparation system may be an array arrangement with a single-row arrangement or a double-row arrangement, and 2 to 4 sets of the atomization mechanisms may be provided. However, in the case of a medium frequency smelting furnace, a homogeneous insulated quantitative pouring furnace, and a precision-controlled liquid level temperature pouring ladle being one set, the alloy melt may be continuously and quantitatively supplied to the atomization mechanisms with a plurality set of array arrangements, to achieve high-efficiency continuous pouring and jointly atomization of a plurality set of rotary disk atomizers, thereby greatly improving the production efficiency and achieving low-cost manufacture of aluminum alloy powder for high-quality additive manufacturing.

2. The medium frequency smelting furnace of the metal powder preparation system is connected to the homogeneous thermal insulation quantitative pouring furnace via a flexible sealing sleeve; the outlet of the homogeneous insulated quantitative pouring furnace is fixedly connected to the liquid inlet of the diversion trench; the liquid outlet of the diversion trench is hermetically connected to the upper cover of the precision-controlled liquid level temperature pouring ladle; the lower liquid port of the precision-controlled liquid level temperature pouring ladle is connected to the centrifugal atomization chamber; and the atomization chamber is hermetically connected to the powder collection and gas circulation system via a pipeline, to realize the hermetic connection of the whole system, prevent the metal melt from contacting with the external atmosphere during the transportation and atomization process, and improve the stability of the overall metal powder preparation system and the product.

3. In the metal powder preparation system, the laser liquid level device monitoring online and the controller feedback are used to drive the liquid control rod linked with the servo motor, adjust the annular gap between the liquid control rod and the liquid control ring, and control the flow rate of the melt in the diversion trench, to realize the accurate control of the liquid level in the pouring ladle crucible. Meanwhile, the quantitative and stable supply of the atomizer is realized by combining with the diameter of the nozzle at the bottom of the pouring ladle crucible, and the control accuracy may reach ±0.05 Kg/min, to realize the accurate and continuous quantitative pouring of the aluminum alloy melt, thus greatly improving the stability of the continuous atomization preparation process.

4. During the atomization and powder preparation using the metal powder preparation system, the metal melt is stirred and homogenized in the homogeneous insulated quantitative pouring furnace by introducing an inert gas through a gas stirring tube, to ensure that the alloy composition is uniform; at the same time, when the metal melt passes through the diversion trench, it flows through the silicon carbide or zirconium oxide filter in the diversion trench to remove impurities and purify the aluminum alloy melt, significantly improving the product quality.

In summary, the present invention provides an efficient continuous pouring system for continuously and quantitatively supplying an alloy melt to a plurality set of rotary disk atomization apparatuses with a plurality set of array arrangements to realize the co-atomization of the plurality set of rotary disk atomizers, thereby greatly improving the production efficiency; in addition, through the structural design, the metal powder preparation system realizes the processes of smelting, pouring, melt transportation, atomization, powder collection, gas circulation, and so on in the closed inert gas protection environment, preventing the metal melt from contacting with the external atmosphere during the transportation and atomization process and improving the stability of the overall apparatus and the product. At the same time, the apparatus uses laser liquid level device monitoring online and controller feedback system to achieve precise control of the liquid level in the pouring ladle crucible, and then combined with the pouring ladle crucible bottom nozzle diameter to achieve precise and quantitative replenishment of the atomizer; and the apparatus in the pouring and melt transportation process, performs stirring homogenization and impurity purification on the metal melt, thereby greatly improving the stability of continuous atomization preparation process and product quality.

BRIEF DESCRIPTION OF THE DRAWINGS

Various other advantages and benefits will become apparent to the ordinarily skilled in the art upon reading the following detailed description of the preferred implementations. The drawings are only for purposes of illustrating the preferred implementations and are not to be construed as limiting the present application.

Moreover, the same reference symbols are used to represent the same components throughout the drawings. In the drawings.

Figure 1:
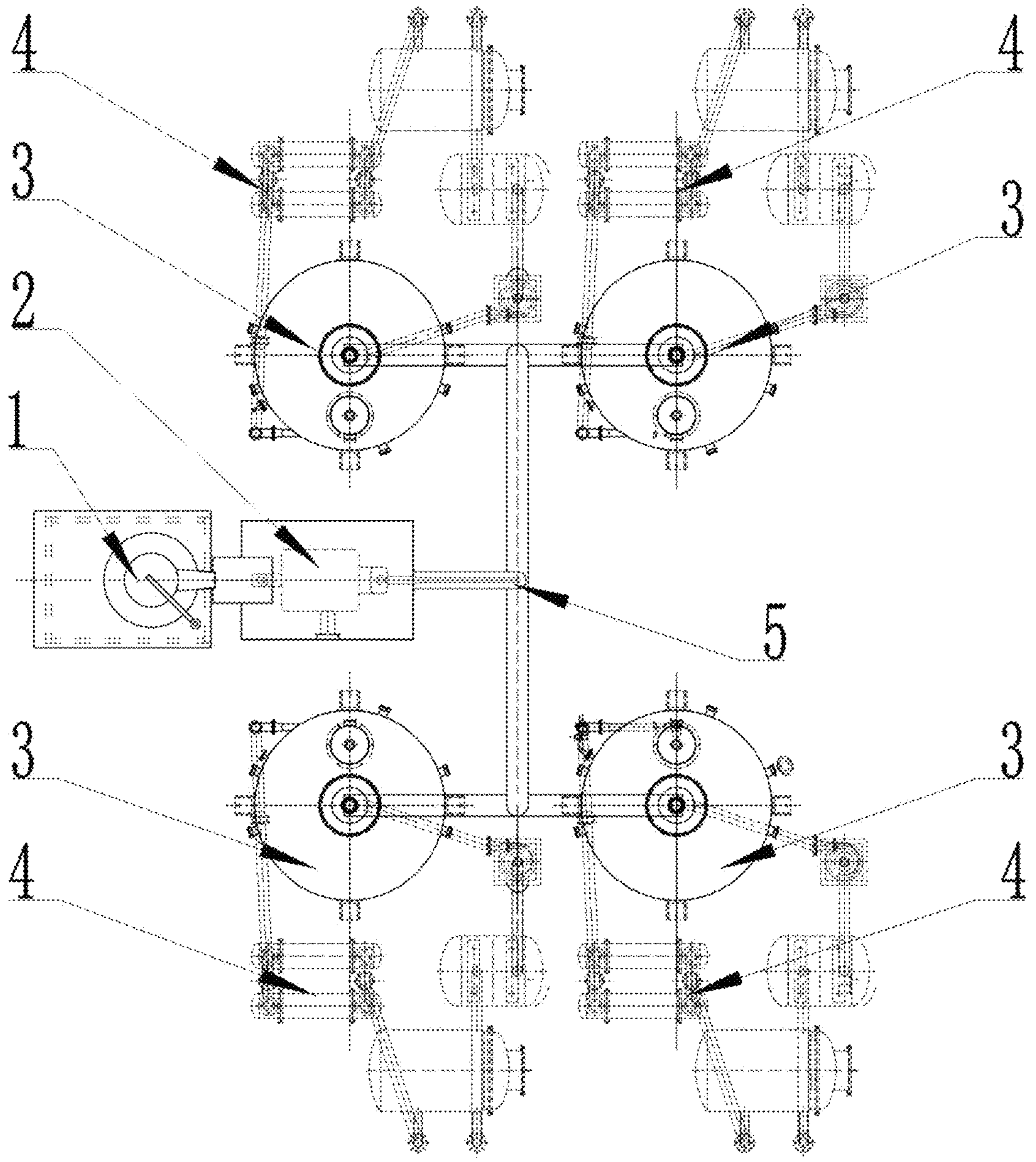
FIG. 1 is an array arrangement diagram of a main device of a metal powder preparation system according to an implementation of the present application.

The reference numbers in the drawings are as follows: 1, medium frequency smelting furnace; 2, homogeneous insulated quantitative pouring furnace; 3, centrifugal atomization apparatus; 4, powder collection and gas circulation system; 5, diversion trench; 6, gas control cabinet; 7, precision-controlled liquid level temperature pouring ladle; 8, laser liquid level device; 9, temperature-liquid level control cabinet; 101, smelting furnace body; 102, smelting furnace sealing cover; 103, medium frequency smelting furnace protective gas tube; 104, medium frequency smelting furnace gate; 105, medium frequency smelting furnace pouring flexible sealing sleeve; 201, homogeneous insulated quantitative pouring furnace liquid receiving port; 202, pouring furnace cover; 203, gas stirring tube; 204, servo motor; 205, liquid control rod; 206, liquid control ring; 207, pouring furnace body; 501, diversion trench cover; 502, diversion trench protective gas tube; 503, diversion trench lower liquid port; 504, filter; 505, observation window; 701, pouring ladle cover; 702, pouring ladle protective gas tube; 703, laser liquid level device detection window; 704, pouring ladle induction coil; 705, copper shield; and 706, pouring ladle crucible.

DETAILED DESCRIPTION OF THE EMBODIMETNS

It is to be noted that the described embodiments are not all but only part of the embodiments of the present application.

All other embodiments obtained by those ordinarily skilled in the art based on the embodiments in the present application without creative work shall fall within the scope of protection of the present application.

Where the description below relates to the drawings, the same numbers in different drawings represent the same or similar elements unless otherwise indicated. The implementations described in the following exemplary implementations do not represent all implementations consistent with the present application. Rather, they are merely examples of the apparatus and method consistent with certain aspects of the present application, as detailed in the appended claims.

In the description of the present application, it is to be understood that the terms "first", "second", and the like are used for descriptive purposes only and are not to be construed as indicating or implying relative importance. For the ordinarily skilled in the art, the specific meaning of the above terms in the present application may be understood in detail. Further, in the description of the present application, "a plurality of" means two or more than two unless otherwise specified. "And/or", describing an associated relationship of associated objects, means that there may be three relationships, for example, A and/or B may mean that there are three cases of A alone, A and B together, and B alone. The character "/" generally indicates an "or" relationship between the associated objects.

Figure 2:
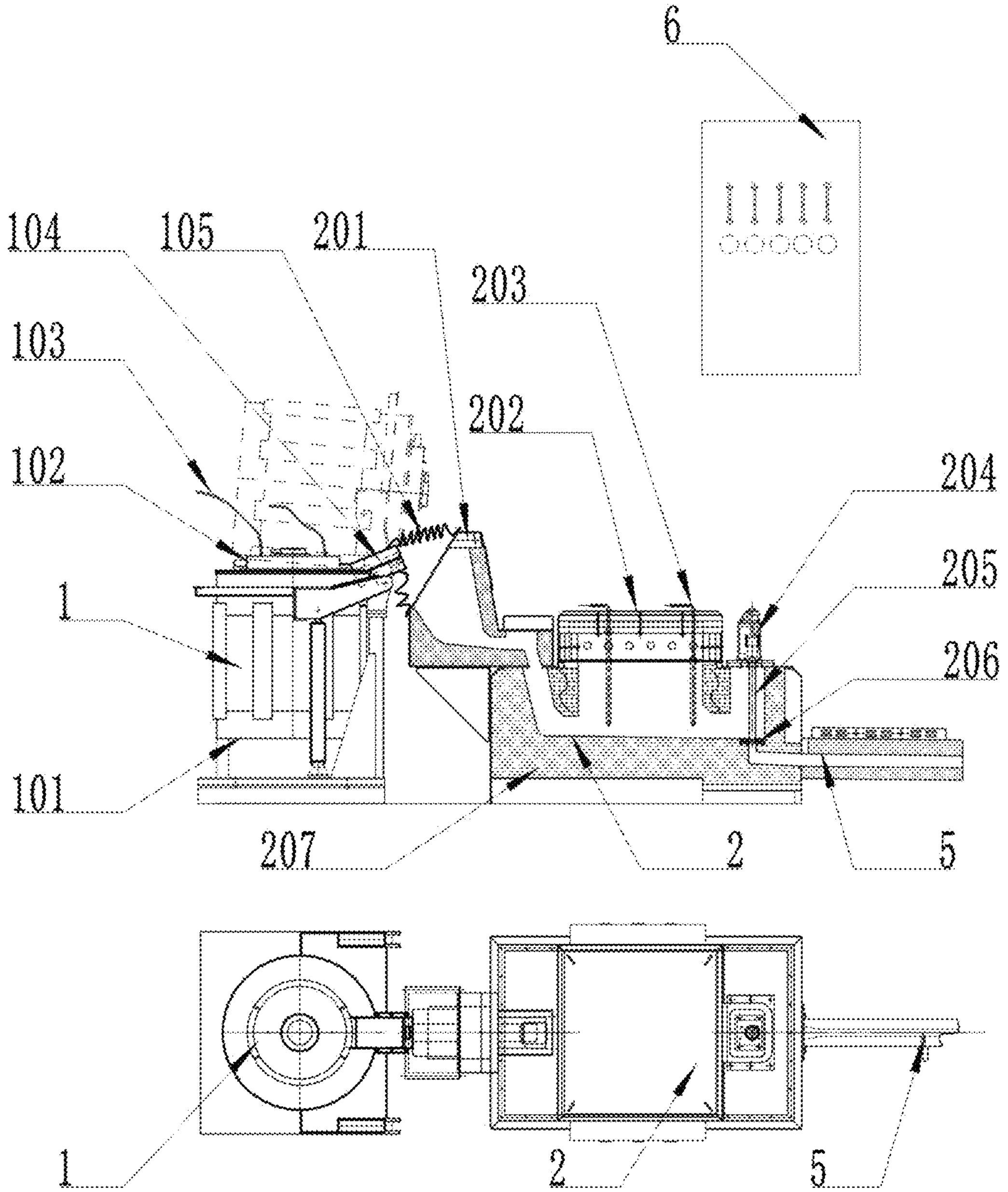
FIG. 2 is a structural diagram showing a medium frequency smelting furnace and a homogeneous insulated quantitative pouring furnace.
Figure 3:
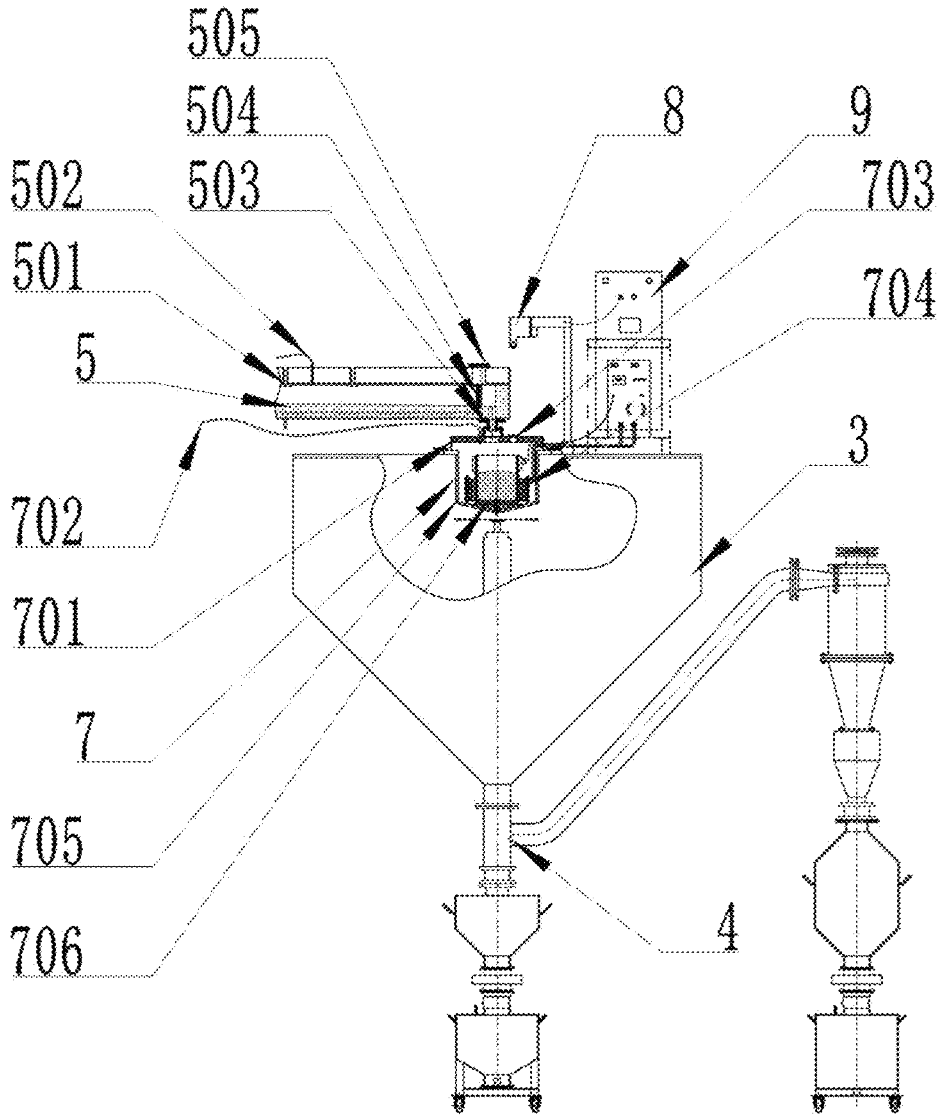
FIG. 3 is a structural diagram showing a precision-controlled liquid level temperature pouring ladle and atomization mechanisms.

FIG. 1 is an array arrangement diagram of a main device of a metal powder preparation system according to an implementation of the present application; FIG. 2 is a structural diagram showing a medium frequency smelting furnace and a homogeneous insulated quantitative pouring furnace; and FIG. 3 is a structural diagram showing a precision-controlled liquid level temperature pouring ladle and atomization mechanisms. The metal powder preparation system and method provided in the embodiments of the present application are described below with reference to the drawings.

The embodiments of the present application disclose a metal powder preparation system. The metal powder preparation system includes a smelting and pouring mechanism, a conveying mechanism, and a plurality of groups of atomization mechanisms; the smelting and pouring mechanism includes a medium frequency smelting furnace 1 and a homogeneous insulated quantitative pouring furnace 2; the conveying mechanism includes a diversion trench 5 and a precision-controlled liquid level temperature pouring ladle 7; the atomization mechanism includes a centrifugal atomization apparatus 3 and a powder collection and gas circulation system 4; and the medium frequency smelting furnace 1, the homogeneous insulated quantitative pouring furnace 2, the diversion trench 5, the precision-controlled liquid level temperature pouring ladle 7, the centrifugal atomization apparatus 3, and the powder collection and gas circulation system 4 are connected in sequence.

By using the metal powder preparation system in the present technical solution, raw materials are added into a medium frequency smelting furnace before heating and melting into a melt, and the melt is poured into a homogeneous insulated quantitative pouring furnace 2; the melt is stirred and homogenized in the homogeneous insulated quantitative pouring furnace 2, and the homogenized melt is quantitatively poured into a precision-controlled liquid level temperature pouring ladle 7; a plurality of groups of atomization mechanisms are supplied with the melt continuously and quantitatively by the precision-controlled liquid level temperature pouring ladle 7; and the quantitatively-supplied melt is dispersed, cooled, and solidified in the atomization mechanisms to obtain uniform and stable metal powder and complete powder collection.

With a set of smelting and pouring mechanisms and conveying mechanisms, the metal melt may be continuously and quantitatively supplied to not less than a set of atomization mechanisms to achieve the purpose of high-efficiency continuous pouring; and under the condition that the metal melt is continuously and quantitatively supplied to the atomization mechanisms by the medium frequency smelting furnace 1, homogeneous insulated quantitative pouring furnace 2, and precision-controlled liquid level temperature pouring ladle 7, the quality of the metal melt in terms of homogeneity, purity, and superheat is ensured, and the supply speed of the metal melt to the atomization mechanisms is accurately grasped. In this way, the preparation quality of metal powder can be improved, and the parameters such as the powder particle size, sphericity, flowability, oxygen content, component distribution, and particle size distribution of the metal powder can all meet the requirements of high-quality metal additive manufacturing, achieving efficient and continuous preparation of the metal powder at the same time.

Specifically, the atomization mechanisms in the implementation are provided with a plurality of groups and arranged in arrays; array arrangements of the atomization mechanisms are single-row arrangements or double-row arrangements; and 2 to 4 sets of the atomization mechanisms are provided. In other implementations, the plurality group of atomization mechanisms may also be arranged in other forms.

In some implementations of the present invention, as shown in FIGS. 2 and 3, the medium frequency smelting furnace gate 104 is hermetically connected to the homogeneous insulated quantitative pouring furnace liquid receiving port 201 via the medium frequency smelting furnace pouring flexible sealing sleeve 105; the liquid inlet of the diversion trench 5 is connected to the outlet of the homogeneous insulated quantitative pouring furnace 2; the liquid outlet of the diversion trench 5 is connected to the precision-controlled liquid level temperature pouring ladle 7 via the diversion trench lower liquid port 503; and the diversion trench 5 flows from the liquid outlet of the homogeneous insulated quantitative pouring furnace 2 to the precision-controlled liquid level temperature pouring ladle 7 for the circulation of the metal melt. The precision-controlled liquid level temperature pouring ladle 7 is mounted on the upper part of the centrifugal atomization apparatus 3, and the powder collection and gas circulation system 4 is connected to the centrifugal atomization apparatus 3 via a pipeline. By the above, the whole set of metal powder preparation systems may be hermetically connected to prevent the metal melt from contacting with the external atmosphere during the transportation and atomization process, and improve the stability of the overall metal powder preparation system and the product.

In some implementations of the present invention, as shown in FIG. 2, a medium frequency smelting furnace 1 includes a smelting furnace body 101, a temperature measurement and control power supply, and a smelting furnace sealing cover 102 covering the smelting furnace body 101; the smelting furnace body 101 includes a medium frequency induction coil and a smelting crucible; a temperature measurement and control power supply is connected to the medium frequency induction coil for monitoring the temperature of the metal melt in the smelting crucible in real time and controlling the operation of the medium frequency induction coil; a medium frequency smelting furnace protective gas tube 103 is connected to the smelting furnace sealing cover 102; two ends of the medium frequency smelting furnace protective gas tube 103 are connected to the interior of the smelting furnace body 101 and a protective gas source, respectively; and the medium frequency smelting furnace protective gas tube 103 can quantitatively pass an inert gas of the protective gas source into the interior of the smelting furnace body 101.

In some implementations of the present invention, as shown in FIG. 2, the homogeneous insulated quantitative pouring furnace 2 includes a pouring furnace body 207 and a pouring furnace cover 202 provided on the pouring furnace body 207; a gas stirring tube 203 is connected to the pouring furnace cover 202, one end of the gas stirring tube 203 being connected to a stirring gas source and the other end extending into the pouring furnace body 207; and a liquid outlet of the pouring furnace body 207 is provided with a valve for controlling liquid output volume of the pouring furnace body 207.

Specifically, the stirring gas source in the present implementation is constituted by the gas control cabinet 6 and the inert gas source together; the liquid outlet of the pouring furnace body 207 is a liquid control ring 206 structure; the valve includes a liquid control rod 205 arranged vertically, the bottom of the liquid control rod 205 cooperates with the liquid control ring 206, and the upper part of the liquid control rod 205 is driven by a servo motor 204 arranged outside the pouring furnace body 207. In other implementations, the valve may have other forms of structures, and any structure that achieves accurate control of the liquid output volume of the pouring furnace body 207 is within the scope of protection of the present invention.

Through the gas source valve and flow meter of the gas control cabinet 6, the gas stirring tube 203 quantitatively feeds an inert gas into the metal melt in the homogeneous insulated quantitative pouring furnace 2 to play the role of stirring homogenization; the servo motor 204 can drive the liquid control rod 205, and the bottom of the liquid control rod 205 cooperates with the liquid control ring 206 to control the liquid output volume of the pouring furnace body 207.

In some embodiments of the present invention, the stirring gas is argon or a mixture of argon and sulfur hexafluoride. A volume fraction of the sulfur hexafluoride is 5% to 20% when the stirring gas is the mixture of argon and sulfur hexafluoride; a flow rate of the stirring gas is 10 to 35 L/min.

In some implementations of the present invention, as shown in FIGS. 2 and 3, a diversion trench 5 includes a diversion trench body and a diversion trench cover 501; a diversion trench protective gas tube 502 is mounted on the diversion trench cover 501, two ends of the diversion trench protective gas tube 502 are connected to the interior of the diversion trench body and a protective gas source, respectively; and the diversion trench protective gas tube 502 can quantitatively pass an inert gas of the protective gas source into the interior of the diversion trench body.

In some implementations of the present invention, as shown in FIG. 3, an observation window 505 is provided on the diversion trench cover 501. The observation window 505 may be used to monitor fluid flow within the diversion trench body.

In some implementations of the present invention, as shown in FIG. 3, at least one filter 504 is arranged in the diversion trench body; the number of filters 504 may be one, two, three, or the like; and the filter 504 is used for filtering impurities in the metal melt to purify the melt.

Specifically, one filter 504 in the present implementation is detachably arranged in the diversion trench body; and the filter 504 is located at the upstream side of the diversion trench body near the diversion trench lower liquid port 503; the filter 504 is a silicon carbide or zirconia ceramic filter 504; the ceramic filter 504 has a thickness of 22 to 35 mm, and a pore size of 10 P to 20 P. In other implementations, a plurality of filters 504 may also be arranged at intervals along the length of the diversion trench body.

In some implementations of the present invention, as shown in FIG. 3, a precision-controlled liquid level temperature pouring ladle 7 includes a pouring ladle body, a pouring ladle cover 701, and a temperature-liquid level control cabinet 9; the pouring ladle body includes a pouring ladle induction coil 704 and a pouring ladle crucible 706; a laser liquid level device detection window 703 is mounted on the pouring ladle cover 701; a laser liquid level device 8 is mounted on the top of the pouring ladle cover 701 corresponding to the laser liquid level device detection window 703; the laser liquid level device 8 is in signal connection with the temperature-liquid level control cabinet 9; the temperature-liquid level control cabinet 9 is in signal connection with the pouring ladle induction coil 704 and the servo motor 204 of the homogeneous insulated quantitative pouring furnace 2; the pouring ladle cover 701 is hermetically connected to the diversion trench 5 via the diversion trench lower liquid port 503; and the upper part of the pouring ladle cover 701 is provided with a pouring ladle protective gas tube 702; and the two ends of the pouring ladle protective gas tube 702 are connected to the interior of the pouring ladle body and the protective gas source, respectively.

The pouring ladle protective gas tube 702 may quantitatively pass the inert gas of the protective gas source into the pouring ladle body; the laser liquid level device 8 detects the liquid level in the pouring ladle crucible 706 via the laser liquid level device detection window 703, and transmits the detected liquid level signal to the temperature-liquid level control cabinet 9; the temperature-liquid level control cabinet 9 controls the servo motor 204 of the homogeneous insulated quantitative pouring furnace 2 via feedback, adjusts the annular gap between the liquid control rod 205 and the liquid control ring 206, and controls the flow rate of the melt in the diversion trench, achieving accurate control of the liquid level in the pouring ladle crucible 706 and achieving a control liquid level deviation of ±10 mm.

At the same time, the pouring ladle crucible 706 controls the temperature of the metal melt in the crucible via the pouring ladle induction coil 704 connected to the temperature-liquid level control cabinet 9; in addition, the diameter of the nozzle at the bottom of the pouring ladle crucible 706 is used to supply the centrifugal atomization apparatus 3 quantitatively and stably, and the flow rate of the melt is generally controlled at 1.5 to 2 Kg/min. A pouring ladle crucible 706 in the center of the precision-controlled liquid level temperature pouring ladle 7, via the output power of the pouring ladle induction coil 704 and the temperature detector online monitoring as well as real-time feedback control of the temperature-liquid level control system, realizes controlling the temperature of the metal melt in the crucible, with the degree of superheat of the aluminum alloy melt being controlled to be 100 to 320° C., and the control accuracy being ±10° C.

In some implementations of the present invention, as shown in FIG. 3, a copper shield 705 is arranged on the inner side of the outer wall of the pouring ladle body, namely, between the pouring ladle induction coil 704 and the outer wall of the precision-controlled liquid level temperature pouring ladle 7; the copper shield 705 is used for preventing the metal sleeve on the outer wall of the precision-controlled liquid level temperature pouring ladle 7 from being induced; specifically, the thickness of the copper shield 705 in the implementation is 2 to 4 mm.

In some implementations of the present invention, the medium frequency smelting furnace protective gas tube 103, the diversion trench protective gas tube 502, and the pouring ladle protective gas tube 702 are all connected to the gas control cabinet 6; the gas control cabinet 6 and the inert gas source together constitute a protective gas source; the ventilation amount is controlled by a gas source valve and a flow meter of the gas control cabinet 6, and the gas is argon or a mixture of argon and sulfur hexafluoride; and the flow rates of the medium frequency smelting furnace protective gas tube 103, the diversion trench protective gas tube 502, and the pouring ladle protective gas tube 702 are 15 to 25 L/min, 5 to 10 L/min, and 10 to 20 L/min, respectively.

The present implementation also provides a metal powder preparation method for producing metal powder using the above metal powder preparation system, the metal powder preparation method including the following steps:

S1: Add raw materials into a medium frequency smelting furnace 27 before heating and melting into a melt, and pour the melt into a homogeneous insulated quantitative pouring furnace 2.

S2: Stir and homogenize the melt in the homogeneous insulated quantitative pouring furnace 2, and quantitatively pour the homogenized melt into a precision-controlled liquid level temperature pouring ladle 7.

S3: Supply a plurality of groups of atomization mechanisms with the melt continuously and quantitatively by the precision-controlled liquid level temperature pouring ladle 7.

S4: The quantitatively-supplied melt is dispersed, cooled, and solidified in the atomization mechanisms to obtain uniform and stable metal powder, and complete powder collection.

The present invention may be applied to the preparation of aluminum alloy powder composed of elements such as Mg, Si, Cu, Sc, Zr, Ti, Er, Cr, P, Mn, Ag, Sn, Zn, Ni, and the like with Al and the preparation of elemental metal powder.

In some implementations of the present invention, before the atomization mechanisms are started, the oxygen content of an atmosphere of the atomization mechanisms is controlled to be 150 to 2000 ppm by vacuuming and filling with nitrogen, argon, or helium, and a circulating gas temperature of the atomization mechanisms is 20 to 45° C. during the metal powder preparation.

The metal powder preparation method using the above metal powder preparation system in the present application will be further described with reference to specific embodiments.

Embodiment 1

In the embodiment, a high-efficiency continuous array centrifugal atomization apparatus 3 as shown in FIG. 1 was selected; the centrifugal atomization apparatus 3 was a double-row arrangement, and a total of four sets of atomization machines were used; aluminum alloy ingots with the contents of Al, Si, and Mg being 89.05%, 10.5%, and 0.45% by weight percentage were selected and added into a medium frequency smelting furnace 1; a smelting furnace sealing cover 102 was closed and argon was introduced; the flow rate of argon was controlled to be 15 L/min; and the melt was heated and melted and the degree of superheat of the melt was ensured to be in the range of 100 to 180° C.

The above melted aluminum alloy melt was poured into a homogeneous insulated quantitative pouring furnace 2; and through a gas stirring tube 203 in the homogeneous insulated quantitative pouring furnace 2, a mixture of argon and sulfur hexafluoride was introduced, with a sulfur hexafluoride volume fraction of 8% and a flow rate of 30 L/min; and the aluminum alloy melt was stirred and homogenized.

The homogenized aluminum alloy melt was quantitatively poured into the diversion trench 5 by adjusting the annular gap of the liquid control rod 205 and the liquid control ring 206. The aluminum alloy melt was protected in the diversion trench 5 by introducing argon gas at a flow rate of 5 L/min through the diversion trench protective gas tube 502, and flowed into a pouring ladle crucible 706 after being purified by a silicon carbide filter 504 with a thickness of 25 mm and a pore size of 10 P.

The aluminum alloy melt in the pouring ladle crucible 706 was protected by introducing argon gas at a flow rate of 10 L/min via the protective gas tube of the precision-controlled liquid level temperature pouring ladle 7; the melt temperature was online monitored by the output power of the pouring ladle induction coil 704 and the temperature detector; and the degree of superheat of the aluminum alloy melt was controlled and achieved to 150±10° C. through real-time feedback of the temperature-liquid level control system, to prevent the induction of the metal sleeve on the outer wall of the pouring ladle; a copper shield 705 was placed between the medium frequency induction coil and the outer wall of the pouring ladle, and the thickness of the copper shield 705 was 2 mm.

For the liquid level of the aluminum alloy melt in the pouring ladle crucible 706, the laser liquid level device 8 monitoring online and the controller feedback were used to drive the liquid control rod 205 linked with the servo motor 204, adjust the annular gap between the liquid control rod 205 and the liquid control ring 206, and control the flow rate of the melt in the diversion trench, to realize the accurate control of the liquid level in the pouring ladle crucible 706. Meanwhile, the flow rate of the atomized aluminum alloy melt was realized to 1.5±0.05 Kg/min in combination with the 3.0 mm diameter nozzle at the bottom of the pouring ladle crucible 706.

Before the start of the atomization and gas circulation system, the oxygen content of the system atmosphere was controlled to 1000 ppm by vacuuming and charging a nitrogen gas; and then an aluminum alloy melt was quantitatively poured onto the rotary disk atomizer; the aluminum alloy melt was dispersed, cooled, and solidified in the centrifugal atomization apparatus 3; and the temperature of the circulation gas was controlled to be 30° C. by a heat exchange system, so that the atomization process was continuously stable to obtain uniform and stable aluminum alloy powder; the powder was collected through the powder collection and gas circulation system 4.

Figure 4:
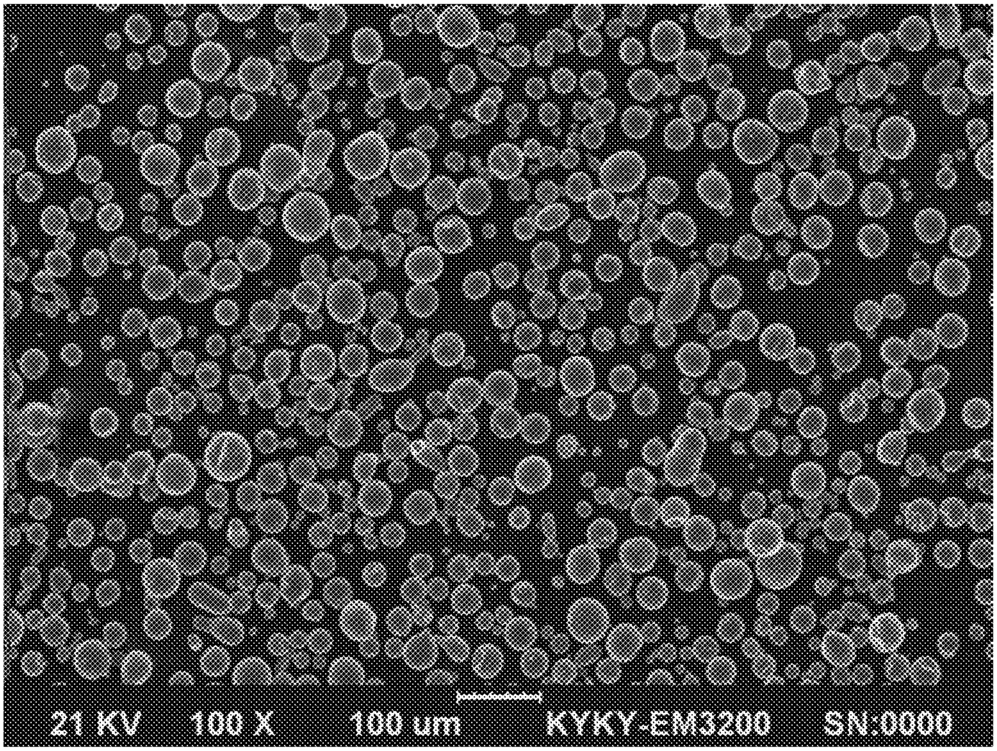
FIG. 4 is a scanning electron microscope photograph of AlSi10Mg powder.

The prepared additive-manufacturing AlSi10Mg powder had a particle size of 15 to 53 μm and a morphology as shown in FIG. 4.

Embodiment 2

In the embodiment, a high-efficiency continuous array centrifugal atomization apparatus 3 as shown in FIG. 1 was selected; the atomization apparatus was a double-row arrangement, and a total of four sets of atomization machines were used; aluminum alloy ingots with the contents of Al, Si, Mg, Sc, Zr, Ti, and Cu being 89.2%, 9.0%, 1.1%, 0.2%, 0.2%, 0.15%, and 0.15% by weight percentage were selected and added into a medium frequency smelting furnace 1; the sealing cover of the medium frequency smelting furnace 1 was closed and argon was introduced with the flow rate being controlled to be 15 L/min; and the melt was heated and melted and the degree of superheat of the melt was ensured to be in the range of 200 to 220° C.

The above melted aluminum alloy melt was poured into a homogeneous insulated quantitative pouring furnace 2; and through a gas stirring tube 203 in the homogeneous insulated quantitative pouring furnace 2, a mixture of argon and sulfur hexafluoride was introduced, with a sulfur hexafluoride volume fraction of 20% and a flow rate of 35 L/min; and the aluminum alloy melt was stirred and homogenized.

The homogenized aluminum alloy melt was quantitatively poured into the diversion trench 5 by adjusting the annular gap of the liquid control rod 205 and the liquid control ring 206. The aluminum alloy melt was protected in the diversion trench 5 by introducing argon gas at a flow rate of 20 L/min through the diversion trench protective gas tube 502, and flowed into a pouring ladle crucible 706 after being purified by a silicon carbide filter 504 with a thickness of 22 mm and a pore size of 20 P.

The aluminum alloy melt in the pouring ladle crucible 706 was protected by introducing argon gas at a flow rate of 15 L/min via the protective gas tube of the precision-controlled liquid level temperature pouring ladle 7; the melt temperature was online monitored by the output power of the pouring ladle induction coil 704 and the temperature detector; and the degree of superheat of the aluminum alloy melt was controlled and achieved to 200±10° C. through real-time feedback of the temperature-liquid level control system, to prevent the induction of the metal sleeve on the outer wall of the pouring ladle; a copper shield 705 was placed between the medium frequency induction coil and the outer wall of the pouring ladle, and the thickness of the copper shield 705 was 2 mm.

For the liquid level of the aluminum alloy melt in the pouring ladle crucible 706, the laser liquid level device 8 monitoring online and the controller feedback were used to drive the liquid control rod 205 linked with the servo motor 204, adjust the annular gap between the liquid control rod 205 and the liquid control ring 206, and control the flow rate of the melt in the diversion trench, to realize the accurate control of the liquid level in the pouring ladle crucible 706. Meanwhile, the flow rate of the atomized aluminum alloy melt was realized to 2.0±0.05 Kg/min in combination with the 3.2 mm diameter nozzle at the bottom of the pouring ladle crucible 706.

Before the start of atomization and gas circulation system, the oxygen content of the system atmosphere was controlled to 500 ppm by vacuuming and charging a nitrogen gas; and then an aluminum alloy melt was quantitatively poured onto the rotary disk atomizer; the aluminum alloy melt was dispersed, cooled, and solidified in the centrifugal atomization apparatus 3; and the temperature of the circulation gas was controlled to be 35° C. by a heat exchange system, so that the atomization process was continuously stable to obtain uniform and stable aluminum alloy powder; and the powder was collected through the powder collection and gas circulation system 4.

Figure 5:
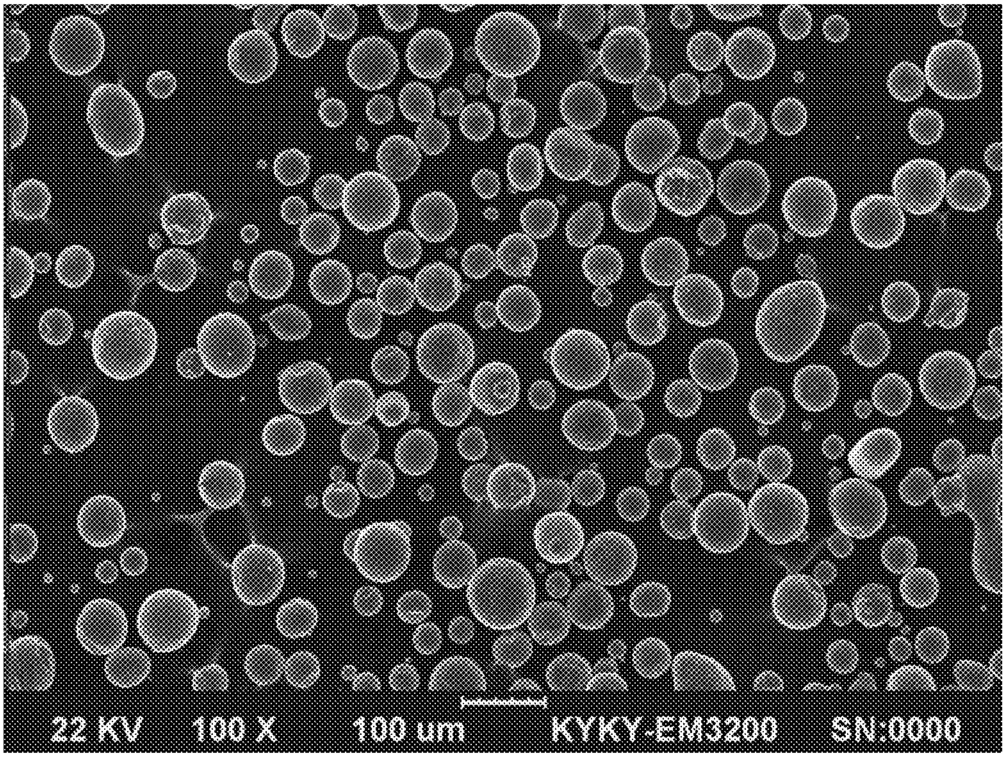
FIG. 5 is a scanning electron microscope photograph of AlSi9Mg1.1ScZr powder.

The prepared additive-manufacturing AlSi9Mg1.1ScZr powder had a particle size of 15 to 53 μm and a morphology as shown in FIG. 5.

The above is only the preferably specific implementation of the present invention, but the scope of protection of the present invention is not limited to this; any change or replacement that may be easily thought of by the skilled familiar with the technical field within the technical scope disclosed by the present invention shall be covered by the scope of protection of the present invention. Accordingly, the protection scope of the present invention shall be subject to the claims.

What is claimed is:

1. A metal powder preparation system, comprising a medium frequency smelting furnace, a homogeneous insulated quantitative pouring furnace, a precision-controlled liquid level temperature pouring ladle, and a plurality of groups of atomization mechanisms connected in sequence;

wherein the homogeneous insulated quantitative pouring furnace comprises a pouring furnace body and a pouring furnace cover provided on the pouring furnace body;

a gas stirring tube is connected to the pouring furnace cover, a first end of the gas stirring tube is connected to a stirring gas source, and a second end of the gas stirring tube is extended into the pouring furnace body; and a liquid outlet of the pouring furnace body is provided with a valve for controlling a liquid output volume of the pouring furnace body.

2. The metal powder preparation system according to claim 1, wherein the plurality of groups of atomization mechanisms comprises 2 to 4 groups of atomization mechanisms arranged in arrays;

wherein array arrangements of the plurality of groups of atomization mechanisms are single-row arrangements or double-row arrangements.

3. The metal powder preparation system according to claim 1, wherein a diversion trench is connected between the homogeneous insulated quantitative pouring furnace and the precision-controlled liquid level temperature pouring ladle, the diversion trench is configured for a metal melt circulation from a liquid outlet of the homogeneous insulated quantitative pouring furnace to the precision-controlled liquid level temperature pouring ladle.

4. The metal powder preparation system according to claim 3, wherein the medium frequency smelting furnace, the homogeneous insulated quantitative pouring furnace, the diversion trench, the precision-controlled liquid level temperature pouring ladle, and the plurality of groups of atomization mechanisms are hermetically connected in sequence.

5. The metal powder preparation system according to claim 1, wherein the medium frequency smelting furnace comprises a smelting furnace body and a smelting furnace sealing cover provided on the smelting furnace body, the smelting furnace body comprises a medium frequency induction coil, a smelting crucible, and a temperature measurement and control power supply.

6. The metal powder preparation system according to claim 5, wherein a medium frequency smelting furnace protective gas tube is connected to the smelting furnace sealing cover, a first end of the medium frequency smelting furnace protective gas tube is connected to an interior of the smelting furnace body, and a second end of the medium frequency smelting furnace protective gas tube is connected to a protective gas source.

7. The metal powder preparation system according to claim 3, wherein the diversion trench comprises a diversion trench body and a diversion trench cover, a diversion trench protective gas tube is mounted on the diversion trench cover, and a first end of the diversion trench protective gas tube is connected to an interior of the diversion trench body, and a second end of the diversion trench protective gas tube is connected to a protective gas source.

8. The metal powder preparation system according to claim 7, wherein an observation window is provided on the diversion trench cover.

9. The metal powder preparation system according to claim 7, wherein at least one filter is provided in the diversion trench body;

wherein the at least one filter is a ceramic filter.

10. The metal powder preparation system according to claim 9, wherein the ceramic filter has a thickness of 22 to 35 mm and a pore size of 10 P to 20 P.

11. The metal powder preparation system according to claim 1, wherein the precision-controlled liquid level temperature pouring ladle comprises a pouring ladle body, a pouring ladle cover, and a temperature-liquid level control cabinet, the pouring ladle body comprises a pouring ladle induction coil and a pouring ladle crucible, a laser liquid level device detection window is provided on the pouring ladle cover, and a laser liquid level device is provided at a top of the pouring ladle cover corresponding to the laser liquid level device detection window.

12. The metal powder preparation system according to claim 11, wherein the pouring ladle body is provided with a copper shield on an inner side of an outer wall;

wherein the copper shield has a thickness of 2 to 4 mm.

13. The metal powder preparation system according to claim 11, wherein a pouring ladle protective gas tube is connected to the pouring ladle cover, a first end of the pouring ladle protective gas tube is connected to an interior of the pouring ladle body, and a second end of the pouring ladle protective gas tube is connected to a protective gas source.

14. A metal powder preparation method for producing a metal powder using the metal powder preparation system according to claim 1, the metal powder preparation method comprising:

adding raw materials into the medium frequency smelting furnace before heating and melting into a melt, and pouring the melt into the homogeneous insulated quantitative pouring furnace;

stirring and homogenizing the melt in the homogeneous insulated quantitative pouring furnace to obtain a homogenized melt, and quantitatively pouring the homogenized melt into the precision-controlled liquid level temperature pouring ladle;

supplying the plurality of groups of atomization mechanisms with the homogenized melt continuously and quantitatively by the precision-controlled liquid level temperature pouring ladle; and subjecting a quantitatively-supplied melt to dispersing, cooling, and solidification in the plurality of groups of atomization mechanisms to obtain a uniform and stable metal powder and completing a powder collection.

15. The metal powder preparation method according to claim 14, wherein before the plurality of groups of atomization mechanisms are started, an oxygen content of an atmosphere of the plurality of groups of atomization mechanisms is controlled to be 150 to 2000 ppm by vacuuming and filling with nitrogen, argon, or helium, and a circulating gas temperature of the plurality of groups of atomization mechanisms is 20 to 45° C. during a metal powder preparation.

16. The metal powder preparation method according to claim 14, wherein a protective gas is introduced into the medium frequency smelting furnace, a transportation process of the homogeneous insulated quantitative pouring furnace to the precision-controlled liquid level temperature pouring ladle, and the precision-controlled liquid level temperature pouring ladle to protect a metal melt;

wherein the protective gas is argon or a mixture of argon and sulfur hexafluoride; and flow rates of the protective gas introduced into the medium frequency smelting furnace, the transportation process of the homogeneous insulated quantitative pouring furnace to the precision-controlled liquid level temperature pouring ladle, and the precision-controlled liquid level temperature pouring ladle are 15 to 25 L/min, 5 to 10 L/min, and 10 to 20 L/min, respectively.

17. The metal powder preparation method according to claim 14, wherein a stirring gas is introduced into the melt in the homogeneous insulated quantitative pouring furnace to homogenize the melt;

wherein the stirring gas is argon or a mixture of argon and sulfur hexafluoride;

a volume fraction of the sulfur hexafluoride is 5% to 20% when the stirring gas is the mixture of argon and sulfur hexafluoride; and a flow rate of the stirring gas is 10 to 35 L/min.

18. The metal powder preparation method according to claim 14, wherein a degree of superheat of the homogenized melt in the precision-controlled liquid level temperature pouring ladle is 100 to 320° C., a liquid level deviation is ±10 mm, and a melt flow rate of a nozzle at a bottom is 1.5 to 2 Kg/min.

19. The metal powder preparation system according to claim 2, wherein the medium frequency smelting furnace comprises a smelting furnace body and a smelting furnace sealing cover provided on the smelting furnace body, the smelting furnace body comprises a medium frequency induction coil, a smelting crucible, and a temperature measurement and control power supply.

* * * * *